June 4, 1935.　　W. L. KAUFFMAN, 2D　　2,003,595
HEADED PIN
Filed Sept. 15, 1932　　2 Sheets-Sheet 1
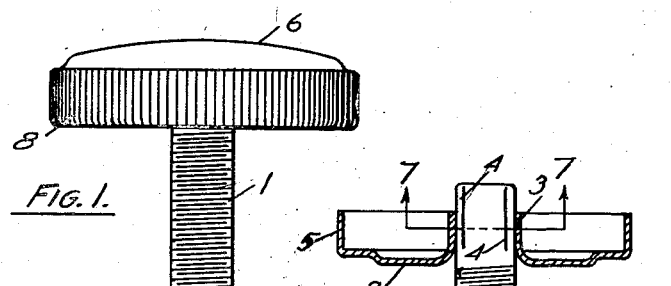
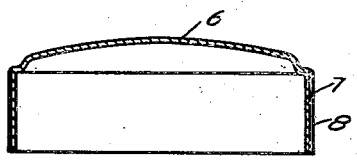
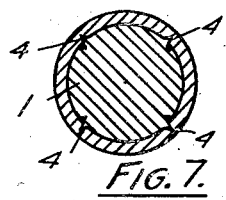
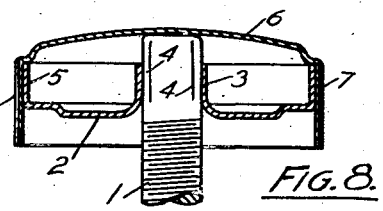
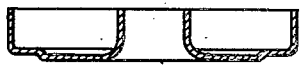
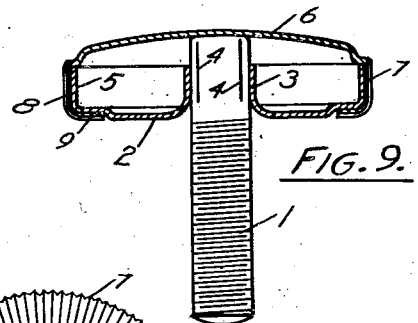
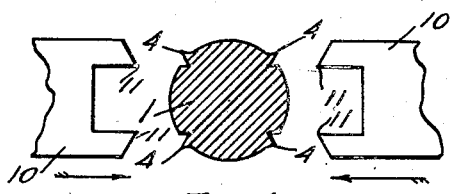
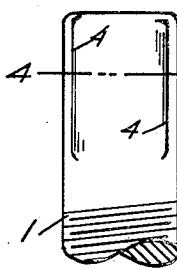
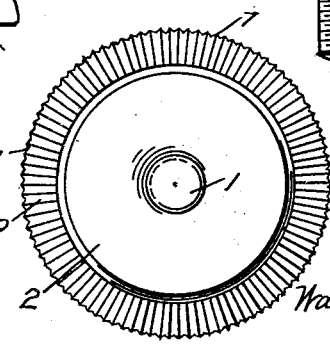
Walter L. Kauffman II
INVENTOR.
BY
ATTORNEYS.

June 4, 1935. W. L. KAUFFMAN, 2D 2,003,595
HEADED PIN
Filed Sept. 15, 1932 2 Sheets-Sheet 2

Walter L. Kauffman II
INVENTOR.
BY
ATTORNEYS.

UNITED STATES PATENT OFFICE 2,003,595

HEADED PIN

Walter L. Kauffman, 2d, Erie, Pa., assignor to Lovell Manufacturing Company, Erie, Pa., a corporation of Pennsylvania Application September 15, 1932, Serial No. 633,316

1 Claim. (Cl. 85—9)

The present invention is designed to provide a headed pin, such pins being used under numerous conditions. One example is a headed screw-threaded pin which may be used for adjusting different devices, such as a tension screw for a wringer. With such devices it is desirable to provide the head for the pin in as cheap a manner as possible, to form it so that it may be readily grasped, and have such engaging surfaces that the hand of the operator will not slip in turning the pin. Features and details of the invention will appear from the specification and claim.

A preferred embodiment of the invention is illustrated in the accompanying drawings as follows:—

Fig. 1 shows a side elevation of a completed structure.

Fig. 2 a section of a detached cap.

Fig. 3 a detached section of a base plate.

Fig. 4 a diagrammatic view showing a manner of creasing the pin to more definitely secure the cap thereon.

Fig. 5 an enlarged view of the end of the pin.

Fig. 6 a view of the pin with the base plate in section thereon.

Fig. 7 a section on the line 7—7 in Fig. 6.

Fig. 8 a sectional view with the cap and base plate assembled, but prior to the crimping of the lower edge of the cap.

Fig. 9 a sectional view of the completed article.

Fig. 10 a bottom view of the completed article.

Figure 11:
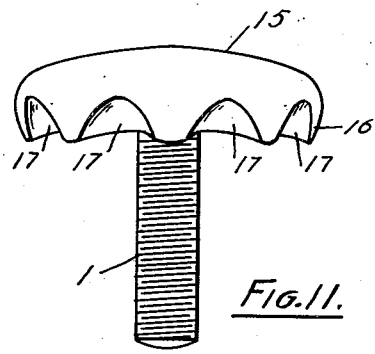

Fig. 11 an elevation of a modified structure.

Figure 12:
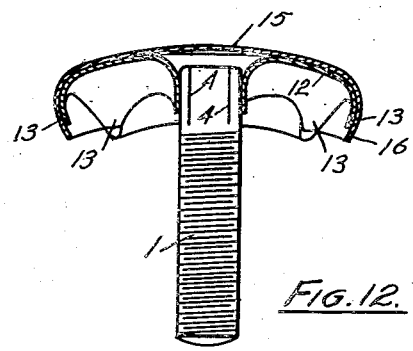

Fig. 12 a sectional view of the modified structure.

Figure 13:
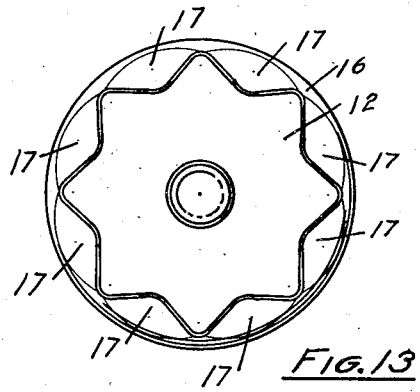

Fig. 13 a bottom view of the modified structure.

Figure 14:
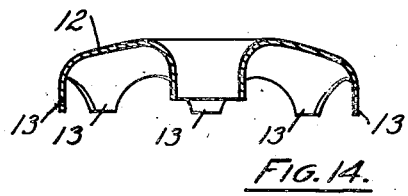

Fig. 14 a detached view of the base plate before assembly.

Figure 15:
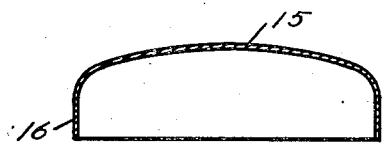

Fig. 15 a detached sectional view of the head cap before assembly.

1 marks the pin which, as shown, is a screw-threaded pin, and 2 a base plate. The base plate has a flanged opening at the center, the flanges 3 extending upwardly. The pin is provided with sharp ribs 4 and the base plate is forced on to the pin and along these ribs under pressure so that the ribs bite into the metal of the flanges and lock the base plate against turning on the pin. The base plate has the upwardly extending outer peripheral flange 5.

The head has a cap 6. This has a peripheral flange 7 which is provided with corrugations, preferably of the knurled type 8. The cap is telescopically assembled on the base plate, the under-side of the center of the cap resting on the top of the pin. With the parts in this position the flange 7 is crimped in under the base plate providing an inwardly extending under surface 9 on the head which is knurled, or corrugated in a manner similar to the sides. This is a desirable construction in that the operator gets a more definite hold on the head not only on the outer periphery of the head, but on the under-side thereof as the fingers engage the under surface.

The ribs 4 are conveniently made by dies 10 operating from opposite sides of the pin, these dies having cutting edges 11 which engage the surface of the pin and strike up the sharp edged ribs 4.

In the modified structure the same pin is used. A base plate 12 has a flanged central opening, the flange extending downwardly. The outer peripheral plate is provided with downwardly extending fingers 13, these fingers being arranged around the periphery of the plate. The cap 15 has peripheral flanges 16. As initially provided these flanges are practically cylindrical and in asesmbly these flanges telescope the fingers 13. The peripheral flange 16 is then forced inwardly along its bottom edge forming a series of flutes, or large corrugations 17 registering with the fingers, the inwardly extending portion of the flutes extending between the fingers and the fingers extending into recesses formed on the inner periphery of the cap by the flutes, or corrugations.

It will be noted that the base plates 2 and 12 and the head caps 6 and 15 are formed of metal of uniform thickness, commonly designated sheet metal. The corrugated side walls, or flanges of the head caps not only afford a grip for the periphery, but the corrugation facilitates the flanging operation both as to exterior of the flange and the crimping in of the flange under the base plate.

What I claim as new is:—

A headed pin comprising a pin; a base plate secured to the pin; and a sheet metal cap having a peripheral flange telescoping the periphery of the base plate, the edge of the cap flange extending under the base plate, the cap flange being corrugated on its outer periphery, the corrugations extending under the base plate.

WALTER L. KAUFFMAN, II.